(12) United States Patent
Menon et al.

(10) Patent No.: US 12,728,786 B2
(45) Date of Patent: Sep. 8, 2026

(54) SYSTEMS AND METHODS FOR AUTOMATED LOADING AND UNLOADING FOR DELIVERY VEHICLES

(71) Applicant: Ford Global Technologies, LLC, Dearborn, MI (US)

(72) Inventors: Meghna Menon, Ann Arbor, MI (US); Geoffrey Horowitz, Birmingham, MI (US); Sarah Garrow, Coral Gables, FL (US); Jason Snow, Ferndale, MI (US); John Vincent, Livonia, MI (US); Yifan Chen, Ann Arbor, MI (US); Kevin Hwang, Northville, MI (US); Kurt Lundeen, Novi, MI (US); Timothy Feldkamp, Ann Arbor, MI (US); Smruti Panigrahi, Novi, MI (US); Sam Hoff, Hazel Park, MI (US)

( * ) Notice: Subject to any disclaimer, the term of this patent is extended or adjusted under 35 U.S.C. 154(b) by 383 days.

(21) Appl. No.: 18/460,283

(22) Filed: Sep. 1, 2023

(65) Prior Publication Data

US 2025/0074286 A1 Mar. 6, 2025

(51) Int. Cl.

| | |
|---|---|
| ***B60P 1/52*** | (2006.01) |
| ***B60P 1/34*** | (2006.01) |
| ***B60P 3/00*** | (2006.01) |

(52) U.S. Cl.
CPC .................. *B60P 1/52* (2013.01); *B60P 1/34* (2013.01); *B60P 3/007* (2013.01)

(58) Field of Classification Search
CPC ................................ B60P 3/007; B65G 1/133
See application file for complete search history.

(56) References Cited

U.S. PATENT DOCUMENTS

| | | | | |
|---|---|---|---|---|
| 4,909,378 A * | 3/1990 | Webb | B60P 1/52 414/528 |
| 11,119,487 B2 | 9/2021 | Jarvis et al. | |
| 11,731,170 B2 * | 8/2023 | Buttolo | B07C 3/008 209/606 |
| 11,978,012 B2 * | 5/2024 | Gil | B65G 1/133 |
| 11,981,508 B2 * | 5/2024 | Chen | B60P 1/6436 |
| 12,017,547 B2 * | 6/2024 | Kazyak | B60L 1/006 |
| 12,473,149 B1 * | 11/2025 | Brady | B60P 3/007 |
| 2017/0107055 A1 | 4/2017 | Magens et al. | |

(Continued)

OTHER PUBLICATIONS

6 River Systems, LLC, Guide to Warehouse Robots: Types of Warehouse Robots, Uses, Navigation & More, Jan. 19, 2023, pp. 1-15.

*Primary Examiner* — Jonathan Snelting
(74) *Attorney, Agent, or Firm* — Emily Campbell; Eversheds Sutherland (US) LLP

(57) ABSTRACT

A vehicle including a plurality of first motorized tiles and a vehicle elevator is disclosed. The plurality of first motorized tiles may be disposed in a vehicle interior portion. The plurality of first motorized tiles may be configured to move and secure a first bin of a first size and a second bin of a second size. The vehicle elevator may include a second motorized tile and a set of third motorized tiles. The second motorized tile may be configured to receive the second bin from the plurality of first motorized tiles and secure the second bin. The second motorized tile may be of a third size. Further, each third motorized tile may be configured to receive the first bin from the plurality of first motorized tiles and secure the first bin. Each third motorized tile may be of a fourth size.

15 Claims, 10 Drawing Sheets

(56) References Cited

U.S. PATENT DOCUMENTS

| | | | | |
|---|---|---|---|---|
| 2017/0291766 | A1* | 10/2017 | Orth .................. | G06Q 10/0832 |
| 2018/0333841 | A1 | 11/2018 | Bastian, II et al. | |
| 2020/0074404 | A1* | 3/2020 | Gil, Jr. .................. | B64U 50/39 |
| 2021/0163223 | A1 | 6/2021 | Lindbo et al. | |
| 2021/0221618 | A1 | 7/2021 | Austrheim | |
| 2023/0143630 | A1* | 5/2023 | Cieszkowski, III .... | B60P 3/007<br>296/24.36 |
| 2023/0303328 | A1* | 9/2023 | Gil ........................ | B65G 1/137 |

* cited by examiner 516
606
610
514
604
608
602
504
120

516
604
606
610
608
602
504
120

516
514
704
702
120
504

702
120
504

SYSTEMS AND METHODS FOR AUTOMATED LOADING AND UNLOADING FOR DELIVERY VEHICLES

FIELD

The present disclosure relates to systems and methods for facilitating automated loading and unloading for delivery vehicles and more particularly to systems and methods for facilitating loading and unloading of bins of different sizes and types to/from the delivery vehicles.

BACKGROUND

With the continued growth of internet-based commerce, package delivery is increasingly used to deliver goods to customers. However, the rapid growth also leads to operational challenges in the supply chain. E-commerce companies and their delivery partners deliver an ever-increasing count of packages per day, while reducing resource spend on resources (e.g., labor, fuel consumption, etc.).

Various approaches are currently used to optimize the process of loading/unloading delivery packages to/from a delivery vehicle and the process of delivering packages to respective delivery locations. For example, E-commerce companies load packages with similar delivery addresses in proximity to each other in a delivery vehicle to gain efficiency in unloading packages. Further, E-commerce companies use centralized inventory management systems to monitor movement of their delivery vehicles to gain efficiency and reduce chances of human error during transit.

While conventional methods performed by the E-commerce companies are effective in gaining efficiency, there remain challenges. For example, loading/unloading of delivery packages to/from a delivery vehicle is still a manual process and hence requires resources that may be unavailable or expensive. Furthermore, manually loading/unloading delivery packages of different sizes may be challenging and may lead of loss of operational efficiency.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
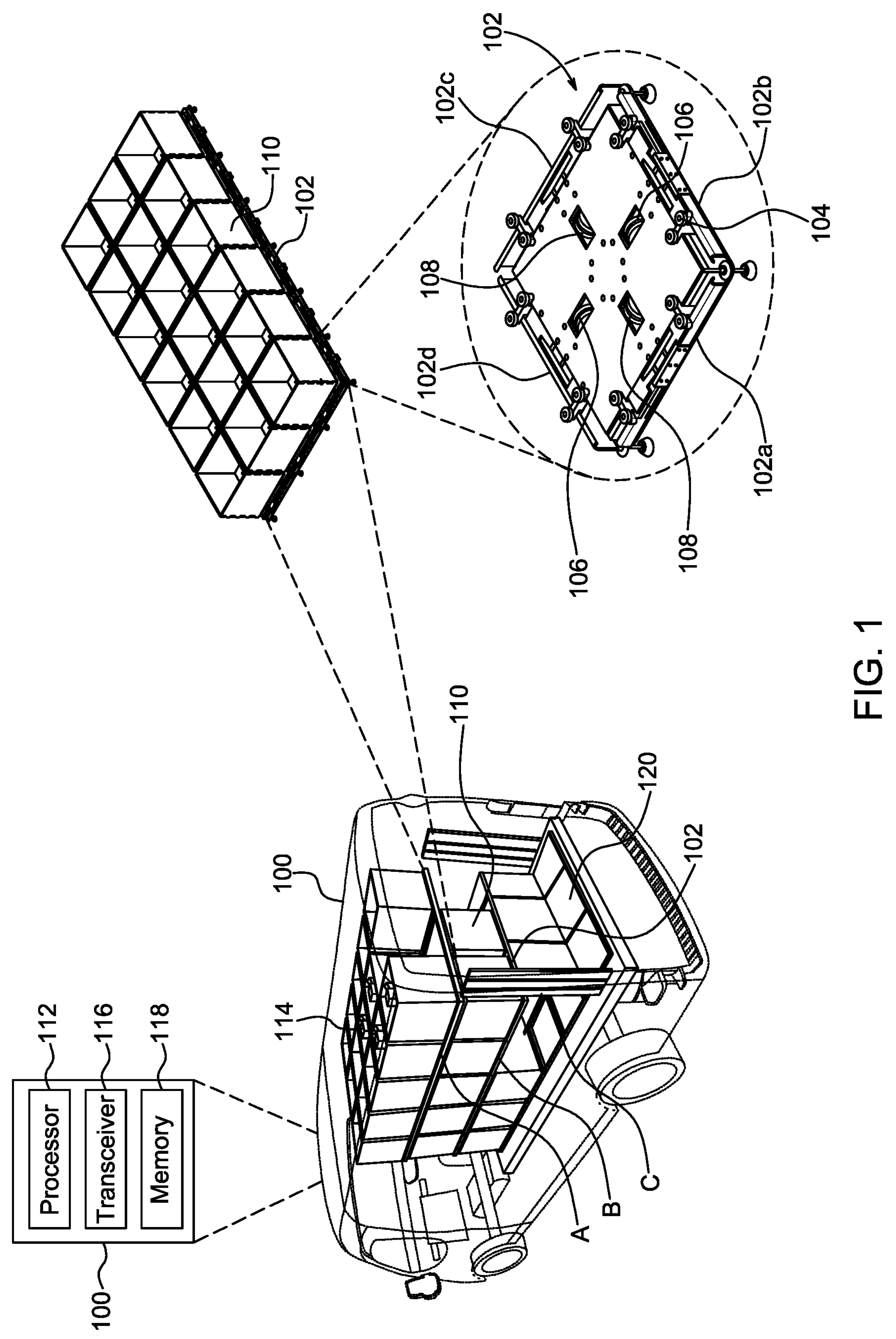
FIG. 1 depicts an example delivery vehicle in which techniques and structures for providing the systems and methods disclosed herein may be implemented.

The present disclosure describes a delivery vehicle configured to deliver a plurality of packages to respective delivery locations. The vehicle may include a plurality of first motorized tiles disposed in a vehicle interior portion on which a plurality of bins of different sizes may be moved and/or secured. In an exemplary aspect, the plurality of bins may include a first bin of small size (e.g., a first size), a second bin of medium size (e.g., a second size) and a third bin of large size (e.g., a third size). Each bin may be configured to store one or more delivery packages. The vehicle may further include an elevator that may be configured to vertically move up and down along a vehicle height, and receive the bins from the plurality of first motorized tiles. In some aspects, the elevator may be configured to move the bins from the plurality of first motorized tiles to be in proximity to a vehicle cargo bed, from where a vehicle operator or a delivery drone/robot may pick the bin/package for unloading or for last-mile delivery.

In some aspects, the elevator may include a second motorized tile and a set of third motorized tiles. The second motorized tile may be of a fourth size and may be configured to receive the second bin from the plurality of first motorized tiles and secure the second bin. Each third motorized tile may of a fifth size and may be configured to receive and secure the first bin. The fifth size may be equivalent to the first size. Further, the set of third motorized tiles collectively may receive and secure the third bin.

The vehicle may further include a processor that may control operation of each of the plurality of first motorized tiles, the second motorized tile and the set of third motorized tiles, to enable autonomous bin loading/unloading to/from the vehicle. For example, when the vehicle reaches a delivery location of a specific delivery package, the processor may cause the plurality of first motorized tiles to move the bin storing the specific delivery package towards the elevator. Based on the bin size, the processor may then cause either the second motorized tile, a third motorized tile or the set of third motorized tiles collectively to receive the bin from the plurality of first motorized tiles and secure the bin. The processor may then cause vertical elevator movement to enable autonomous bin unloading from the vehicle. In a similar (and reverse) manner, the processor may enable autonomous loading of bins of different sizes by using the motorized tiles included in the elevator and the plurality of first motorized tiles.

In some aspects, each bin, from the plurality of bins, may include a base and a side panel. In an exemplary aspect, a side panel edge may be pivotally attached to a base edge, which may enable the side panel to move between a closed position and an open position. In further aspects, the elevator may be configured to tilt the bin when the bin may be placed on the elevator and the elevator may be disposed in proximity to the vehicle cargo bed. In some aspects, bin tilting may cause the delivery package stored in the bin to slide in a bin interior portion, thereby pushing and moving the side panel from the closed position to the open position. When the delivery package slides off the bin through the side panel in the open position, a delivery robot may hold the delivery package, thus enabling autonomous delivery package unloading. In a similar (and reverse) manner, the delivery package may be autonomously loaded into the bin via the side panel.

In additional aspects, the vehicle may include a bin grabber that may configured to engage with the bins to enable autonomous bin loading/unloading. In this case, the bin grabber may include grabbing means, e.g., cleats or hooks, and each bin may include corresponding bin receivers or cavities that may engage or lock with the grabbing means. The bin grabber may be further configured to move in 3-Dimensional space within the vehicle interior portion. In an exemplary aspect, when a bin may be required to be unloaded from the vehicle, the plurality of first motorized tiles may move the bin in proximity to the bin grabber. The bin grabber may cause the grabbing means to engage with the bin receivers, to secure the bin with the bin grabber. The bin grabber may then move the bin in proximity to the vehicle cargo bed, thereby enabling autonomous bin unloading. In a similar (and reverse) manner, the bin grabber may enable autonomous bin loading into the vehicle.

The present disclosure discloses a vehicle that enables autonomous loading and unloading of bins into/from the vehicle. Since the vehicle autonomously loads and unloads bins, minimal or no manual intervention is required, resulting in resource savings and elimination of human error. Further, the vehicle does not require external hardware to enable autonomous bin loading and unloading.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example delivery vehicle 100 (or vehicle 100) in which techniques and structures for providing the systems and methods disclosed herein may be implemented. The vehicle 100 may be a truck, a van (including walk-in vans), a truck trailer, and/or the like. In some aspects, the vehicle 100 may be an autonomous vehicle. In other aspects, a driver (not shown) may operate the vehicle 100. Further, the vehicle 100 may include any powertrain such as, for example, a gasoline engine, one or more electrically-actuated motor(s), a hybrid system, etc.

The vehicle 100 may include one or more layers or arrays of a plurality of motorized tiles 102 disposed in a vehicle interior portion. In the exemplary aspect depicted in FIG. 1, the vehicle 100 includes three arrays or layers (an upper layer "A", a middle layer "B" and a lower layer "C") of the plurality of motorized tiles 102, which are disposed one over the other in the vehicle interior portion. The present disclosure is not limited to the aspect of the vehicle 100 having three layers of motorized tiles as shown in FIG. 1. The vehicle 100 may include more or less than three layers without departing from the present disclosure scope.

In an exemplary aspect, each motorized tile 102 may be rectangular or square in shape (as shown in FIG. 1), and may include four edges 102*a*, 102*b*, 102*c* and 102*d*. Each edge 102*a-d* may include one or more gates 104 that may be configured to move/slide along the lengths of respective edges 102*a-d*. Each motorized tile 102 may further include a first set of wheels 106 that may be configured to rotate in one direction (e.g., a first direction) and a second set of wheels 108 that may be configured to rotate in another direction (e.g., a second direction). In some aspects, the first direction may be perpendicular to the second direction. Further, in an exemplary aspect, a rotation speed of each wheel in the wheel set 106 may be same, and a rotation speed of each wheel in the wheel set 108 may be same.

Each motorized tile 102 may be configured to hold/store a bin 110, and/or move the bin 110 from one location to another in the vehicle interior portion by using the wheels 106 or 108 based on a command signal obtained from a vehicle processor 112 (or processor 112). Specifically, responsive to receiving the command signal from the processor 112, one set of wheels from the first and second sets of wheels 106, 108 may rotate at a preset wheel speed, and the gates 104 on respective edges 102*a-d* may "slide away" from each other to position at the corners of the motorized tile 102. In this arrangement, when a bin (e.g., the bin 110) is placed on the motorized tile 102 or comes in contact with the moving wheels 106 or 108, the bin 110 may move on the motorized tile 102. For example, if the second wheels 108 are rotating in a clockwise direction and the bin 110 comes in contact with the rotating second wheels 108, the bin 110 may slide or move from the edge 102*a* towards the edge 102*c*. In this manner, responsive to receiving the command signal from the processor 112, the motorized tile 102 may enable bin movement on the motorized tile 102.

In further aspects, responsive to receiving another command signal from the processor 112, the motorized tile 102 may stop wheel movement (e.g., stop second wheel movement) and cause the gates 104 on respective edges 102*a-d* to slide towards each other. In this arrangement, the bin 110 may be stored or secured on the motorized tile 102. In some aspects, in this arrangement, the gates 104 may slide towards each other to prevent bin slippage from the motorized tile 102. Such an arrangement may be used when the bin 110 may be required to be transported or securely held in the vehicle 100.

In some aspects, the plurality of motorized tiles 102 may be configured to move and/or secure bins of different sizes, e.g., small-sized bins, medium-sized bins and large-sized bins. In an exemplary aspect, each layer of the motorized tiles 102 in the vehicle 100 may be configured to move and/or secure bins of different sizes. For example, the upper layer "A" of motorized tiles may be configured to move/store small-sized bins, the middle layer "B" of motorized tiles may be configured to move/store medium-sized bins, the lower layer "C" of motorized tiles may be configured to move/store large-sized bins, and/or the like.

In some aspects, each bin 110 may be configured to hold one or more packages 114. In an exemplary aspect, location of each bin in the vehicle 100 and allocation of each package in each bin may be optimally pre-planned or pre-set such that unloading of each package from the vehicle 100 may be convenient (e.g., when the vehicle 100 reaches a package delivery location). In some aspects, information associated with allocation of each package in each bin and location of each bin in the vehicle 100 may be received by a vehicle transceiver 116 (or transceiver 116) from a server (not shown) via one or more network(s).

The network(s) described above may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In an exemplary aspect, the server described above may be associated with an E-commerce firm or a delivery partner that may remotely monitor and/or control movement of a plurality of vehicles operating as part of a vehicle fleet (including the vehicle 100), loading/unloading operation for each vehicle in a warehouse or during transit, and/or the like. The server may transmit the information described above at a predefined frequency to the transceiver 116 during vehicle transit on a delivery route, or when the vehicle 100 commences the delivery route from the warehouse. Responsive to receiving the information from the server, the transceiver 116 may send the information to a vehicle memory 118 (or memory 118) for storage purpose.

The processor 112 may be configured to obtain the information from the memory 118 during transit on the delivery route, and transmit command signals (as described above) to activate movement of one or more motorized tiles 102 to control bin movement in the vehicle interior portion based on the obtained information. For example, when the vehicle 100 reaches a delivery location associated with a specific package, the processor 112 may activate one or more motorized tiles 102 to enable movement of a bin containing the specific package from its storage location in the vehicle 100 (as determined by using the information obtained from the server) to a package pick-up zone/area in the vehicle 100 from where a vehicle operator or a drone may pick the package for last-mile delivery.

The processor 112, as described above, may be disposed in communication with one or more memory devices disposed in communication with the respective computing systems (e.g., the memory 118 and/or one or more external databases not shown in FIG. 1). The processor 112 may utilize the memory 118 to store programs in code and/or to store data for performing aspects in accordance with the disclosure. The memory 118 may be a non-transitory computer-readable storage medium or memory storing delivery package management program code or instructions. The memory 118 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

Although the description above describes an aspect where the processor 112 controls bin movement within the vehicle 100 by activating one or more motorized tiles 102, in some aspects, the activation of motorized tiles 102 and bin movement may be controlled remotely by the server.

In further aspects, the processor 112 may be configured to enable and control loading/unloading of bins to/from the vehicle 100 (specifically, to/from the plurality of motorized tiles 102) based on the information obtained from the server. Specifically, the vehicle 100 may additionally include a vehicle elevator 120 (elevator 120) that enable bin loading and unloading to/from the motorized tiles 102 based on command signals received from the processor 112.

The elevator 120 may be configured to move vertically up and down along vehicle sidewall height to load/unload the bins 110 to/from the upper layer "A", middle layer "B" and/or the lower layer "C". In some aspects, the elevator 120 may include one or more elevator tiles (not shown in FIG. 1) that may be similar to the plurality of motorized tiles 102. The elevator tiles may be configured to receive a bin to be unloaded from one or more motorized tiles 102, and secure the bin. Responsive to the bin being secured on the elevator tile(s), the elevator 120 may move vertically "downwards" to be in proximity to a vehicle cargo bed based on command signals received from the processor 112. In an exemplary aspect, when the elevator 120 may be in proximity to the vehicle cargo bed, the vehicle operator may pick the bin (or a package stored in the bin for last-mile delivery). In additional aspects, the elevator tiles may be configured to unload the bins to a bin holding unit or a delivery robot (not shown in FIG. 1) when the elevator 120 may be in proximity to the vehicle cargo bed.

In further aspects, the elevator 120 may be configured to "tilt" the bin when the elevator 120 may be in proximity to the vehicle cargo bed to enable the bin holding unit or the vehicle operator to conveniently grab or pick the package stored in the bin for last-mile delivery or for storage purpose in a warehouse.

The structural details of the elevator 120 are described in detail below in conjunction with FIGS. 2A, 2B, 3 and 4. Further, the aspect of tilting the bin and enabling bin holding unit to conveniently grab or pick the package stored in the bin is described in detail below in conjunction with FIGS. 5, 6 and 7.

The vehicle 100 and the vehicle operator implement and/or perform operations, as described here in the present disclosure, in accordance with the owner manual and safety guidelines.

Figures 2A, 2B:
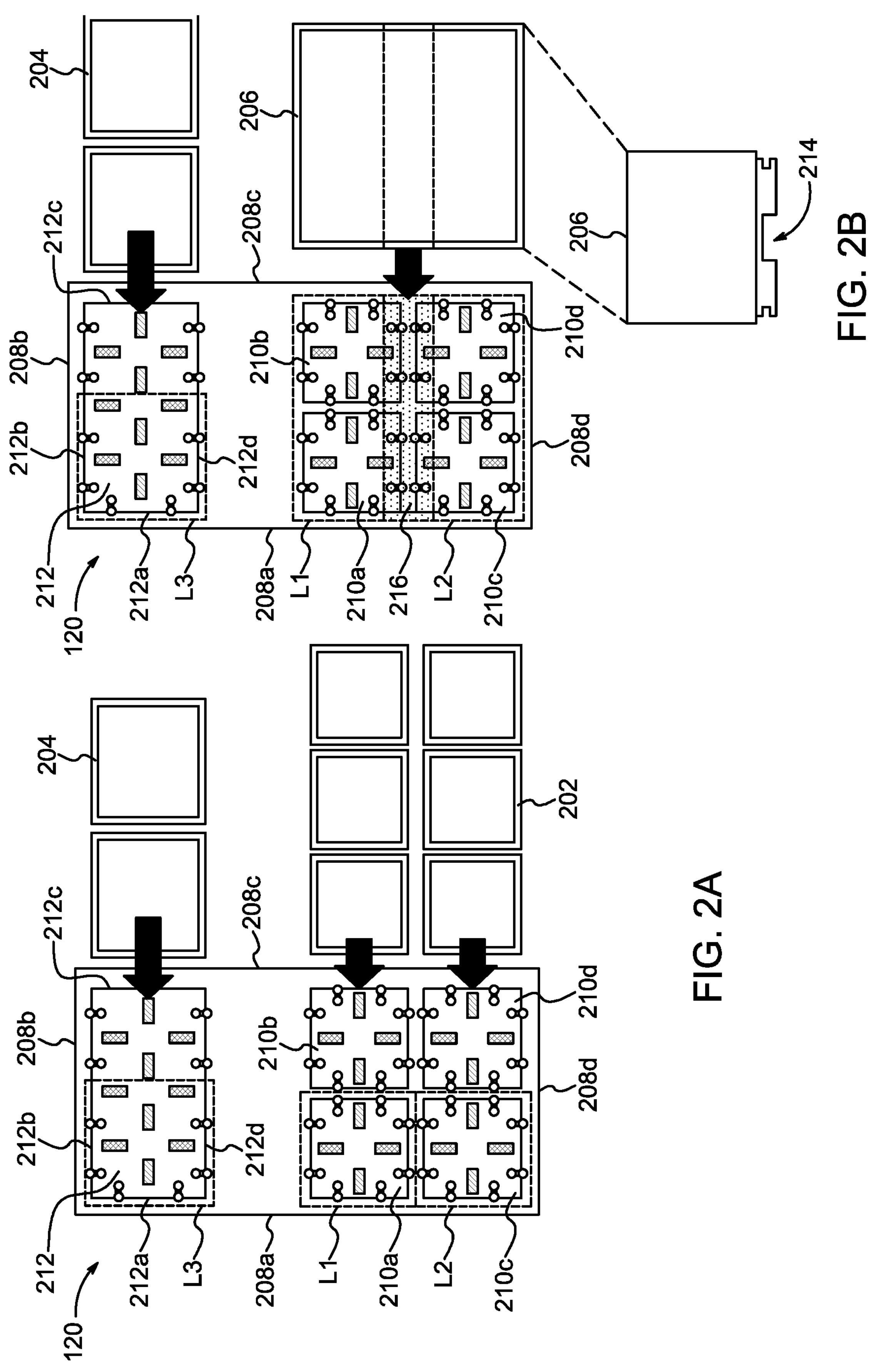
FIGS. 2A and 2B depict top views of an example vehicle elevator and a plurality of bins in accordance with the present disclosure.

FIGS. 2A and 2B depict top views of the elevator 120 and a plurality of bins in accordance with the present disclosure. The plurality of bins may be disposed on the plurality of motorized tiles 102 (not shown in FIGS. 2A and 2B) in the vehicle interior portion. As described above, the plurality of motorized tiles 102 may be configured to move and secure the plurality of bins.

In some aspects, each bin, from the plurality of bins, may be square (as shown in FIGS. 2A and 2B) or rectangular in shape. Further, the plurality of bins may include bins of different sizes. For example, the plurality of bins may include first bins 202 of a first size, second bins 204 of a second size, and a third bin 206 of a third size. In an exemplary aspect, the first bins 202 may be small-sized bins, the second bins 204 may be medium-sized bins and the third bin 206 may be a large-sized bin. The first size, the second size and the third size may be different from each other. In some aspects, the "first size" may be indicative of an area of a first bin base or dimension of an edge of the first bin base, the "second size" may be indicative of an area of a second bin base or dimension of an edge of the second bin base, and the "third size" may be indicative of an area of a third bin base or dimension of an edge of the third bin base. In other aspects, the "first size" may be indicative of a first bin volume, the "second size" may be indicative of a second bin volume, and the "third size" may be indicative of a third bin volume.

In some aspects, each layer of motorized tiles 102 (e.g., the upper layer "A", the middle layer "B" and the lower layer "C", described above in conjunction with FIG. 1) may be configured to secure bins of different sizes. For example, FIG. 2A depicts a top view of a layer (e.g., the upper layer "A") that may secure the first bins 202 and the second bins 204. Further, FIG. 2B depicts a top view of a layer (e.g., the lower layer "C") that may secure the second bins 204 and the third bin 206. In other aspects, each layer may be configured to secure bins of same size. For example, the upper layer "A" may be configured to secure small-sized bins, the middle layer "B" may be configured to secure medium-sized bins, and the lower layer "C" may be configured to secure large-sized bins.

The elevator 120 may be rectangular in shape and may include four edges 208*a*, 208*b*, 208*c* and 208*d*. The edges 208*a* and 208*c* may be parallel to each other, and perpendicular to the edges 208*b* and 208*d*. Further, the edges 208*b* and 208*d* may be parallel to each other. In some aspects, the edge 208*a* may be in proximity to a vehicle exit door (e.g., a vehicle rear or side door, not shown), and the edge 208*c* may be in proximity to the plurality of motorized tiles 102 or the first, second and third bins 202, 204, 206.

As described above in conjunction with FIG. 1, the elevator 120 may include a plurality of elevator tiles. The elevator tiles may be similar in structure and functionality to the plurality of motorized tiles 102 and may include similar components (e.g., wheels, gates, etc.); however, the elevator tiles may have different dimensions from the plurality of motorized tiles 102. In some aspects, the plurality of elevator tiles may include a set of first tiles 210*a*, 210*b*, 210*c* and 210*d* (collectively referred to as set of first tiles 210) and a second tile 212.

Each first tile 210 may be square in shape and may have a fourth size. In some aspects, the "fourth size" may be indicative of an area of each first tile 210 or dimension of each first tile edge. Further, the set of first tiles 210 may be arranged in a "square-shaped" layout or configuration. Specifically, one edge (e.g., a first edge) of the first tile 210*a* may be disposed parallel and adjacent to one edge (e.g., a first edge) of the first tile 210*b*, another edge (e.g., a second edge perpendicular to the first edge) of the first tile 210*a* may be disposed parallel and adjacent to one edge (e.g., a first edge) of the first tile 210*c*, and so on, to enable the set of first tiles 210 to be disposed in a square-shaped layout. Further, the first tiles 210*a* and 210*c* may be disposed in proximity to the edge 208*a*, and the first tiles 210*b* and 210*d* may be disposed in proximity to the edge 208*c*.

The second tile 212 may be rectangular in shape and may have four edges 212*a*, 212*b*, 212*c* and 212*d*. The edge 212*a* may be disposed parallel and adjacent to the edge 208*a*, the edge 212*b* may be disposed parallel and adjacent to the edge 208*b*, the edge 212*c* may be disposed parallel and adjacent to the edge 208*c*, and the edge 212*d* may be disposed parallel to the edge 208*d*. The edges 212*a* and 212*c* may have same lengths, and the edges 212*b* and 212*d* may have same lengths. Further, the edges 212*a* and 212*c* may be shorted than the edges 212*b* and 212*d*. In some aspects, the second tile 212 may have a fifth size. In some aspects, the "fifth size" may be indicative of an area of the second tile 212.

In an exemplary aspect, the first size may be equivalent to or substantially similar to (e.g., within 1-10% range of) the fourth size. Further, the fifth size may be different from the fourth size. In some aspects, the fifth size may be double or substantially equivalent to (e.g., within 1-10% range of) double the fourth size.

Since the first size is equivalent to the fourth size, each first tile 210 may be configured to receive the first bin 202 from the plurality of motorized tiles 102 (via the edge 208*c*) and secure the first bin 202. Example locations of the first bin 202 on the first tiles 210*a*, 210*c* are shown as locations "L1" and "L2" in FIG. 2A. Similarly, the second tile 212 may be configured to receive the second bin 204 from the plurality of motorized tiles 102 (via the edge 208*c*) and secure the second bin 204. An example location of the second bin 204 on the second tile 212 is shown as location "L3" in FIGS. 2A and 2B. In this manner, a single elevator (e.g., the elevator 120) may be configured to receive and secure bins of different sizes, e.g., the first bin 202 of small size and the second bin 204 of medium size, as shown in FIG. 2A.

In some aspect, the set of first tiles 210 collectively may be configured to receive the third bin 206 from the plurality of motorized tiles 102 (via the edge 208*c*) and secure the third bin 206, as shown in FIG. 2B. An example location of the third bin 206 on the set of first tiles 210 is shown as location "L4" in FIG. 2B. In an exemplary aspect, to enable the third bin 206 to move and be securely placed on the set of first tiles 210, the third bin 206 may include a longitudinal slot 214 disposed at a third bin bottom portion. The longitudinal slot 214 may be disposed along an entire length of a third bin base, and may enable the third bin 206 to clear gates 216 (as shown in FIG. 2B) disposed at an intersection of the set of first tiles 210 when the third bin 206 moves or is securely placed on the set of first tiles 210.

In this manner, a single elevator (e.g., the elevator 120) may be configured to receive and secure small, medium and large-sized bins, as described above and shown in FIGS. 2A and 2B.

In operation, the processor 112 (which may be communicatively coupled with the plurality of motorized tiles 102 and the elevator 120) may obtain a first trigger signal via the transceiver 116. In some aspects, the processor 112 may obtain the first trigger signal from the server described above in conjunction with FIG. 1, a user device that may be associated with a vehicle operator, or a vehicle information system (not shown). The first trigger signal may indicate to the processor 112 that the vehicle 100 may have reached a package delivery location or a warehouse, and a bin (e.g., the bin 110) may be required to be unloaded from the vehicle 100.

Responsive to obtaining the first trigger signal, the processor 112 may fetch information associated with the bin 110 that may be stored in the memory 118, as described above in conjunction with FIG. 1. The processor 112 may determine bin location in the vehicle 100 (specifically on the plurality of motorized tiles 102) based on the fetched information. Responsive to determining the bin location, the processor 112 may transmit command signals to the plurality of motorized tiles 102 to cause bin movement and enable the bin 110 to be moved to the elevator 120. Specifically, if the bin 110 is the first bin 202, the processor 112 may cause bin movement from the plurality of motorized tiles 102 to the first tile 210*b* or 210*d*. The processor 112 may then send another command signal to the elevator 120 to cause bin movement from the first tile 210*b* or 210*d* to the first tile 210*a* or 210*c*. Responsive to the bin 110 reaching the first tile 210*a* or 210*c*, a vehicle operator or a drone may pick the bin 110 (or the delivery package disposed in the bin) for unloading or last-mile delivery. In some aspects, if the elevator 120 is disposed in proximity to the upper layer "A" or the middle layer "B" when the bin 110 reaches the first tile 210*a* or 210*c*, the processor 112 may further cause the elevator 120 to move "downwards" towards the lower layer "C" or the vehicle cargo bed, so that the vehicle operator may conveniently pick the bin 110.

In some aspects, if the bin 110 is the third bin 206, the processor 112 may cause bin movement from the plurality of motorized tiles 102 to the set of first tiles 210. Responsive to the bin 110 reaching the set of first tiles 210, the vehicle operator or the drone may pick the bin 110, as described above.

On the other hand, if the bin 110 is the second bin 204, the processor 112 may cause bin movement from the plurality of motorized tiles 102 to the second tile 212 via the edge 212*c*. Responsive to the bin 110 reaching the second tile 212, the processor 112 may send another command signal to the elevator 120 to cause bin movement on the second tile 212, and cause the bin 110 to reach to the location "L3". The vehicle operator or the drone may pick the bin 110 from the elevator 120 when the bin 110 reaches the location "L3", as described above.

Figure 3:
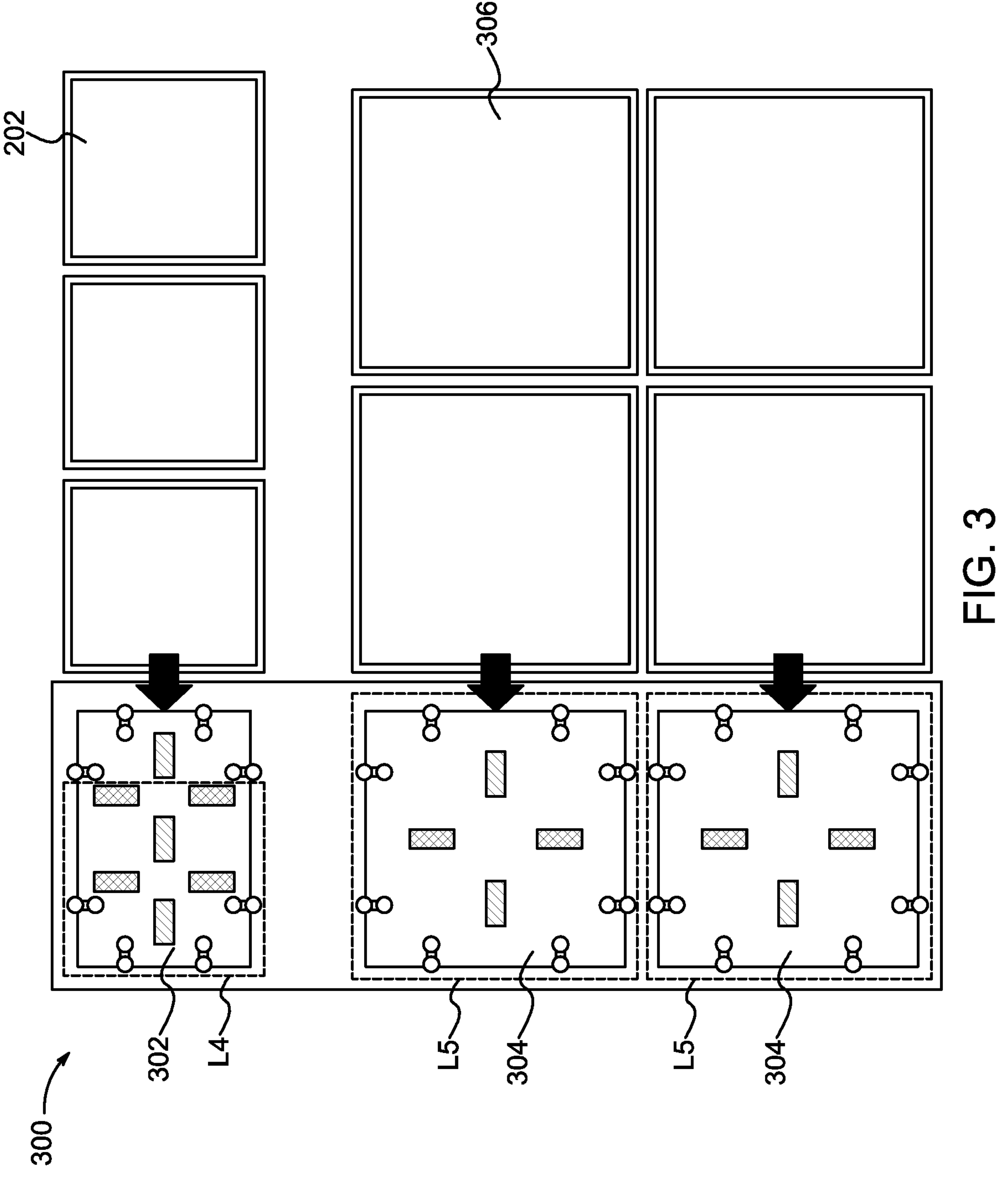
FIG. 3 depicts a top view of another example vehicle elevator in accordance with the present disclosure.

FIG. 3 depicts a top view of another example vehicle elevator 300 (or elevator 300) in accordance with the present disclosure. The elevator 300 may be configured to load/unload small-sized bins and large-sized bins. The elevator 300 may be similar to the elevator 120 and may be disposed in the vehicle interior portion; however, elevator tiles included in the elevator 300 may be different from the elevator tiles included in the elevator 120 described above.

In some aspects, the elevator tiles included in the elevator 300 may include a first tile 302 and one or more second tiles 304. The first tile 302 may be similar in shape to the second tile 212; however, in some aspects, a length of the first tile 302 may be smaller than a length of the second tile 212. The first tile 302 may be configured to move and secure the first bins 202 (i.e., small-sized bins) in a similar manner as described above. An example location of the first bin 202 on the first tile 302 is shown as location "L4".

In other aspects (not shown), the length of the first tile 302 may be equivalent to the length of the second tile 212. In this case, the first tile 302 may be configured to move and secure the second bins 204 (i.e., medium-sized bins, not shown).

The second tile 304 may be a square-shaped tile, and dimension of each second tile edge may be equivalent to the length of the first tile 302. A second tile size (e.g., dimensions and area) may be equivalent to a large bin size (e.g., dimensions and area of bin base of a large-sized bin), and the second tile 304 may be configured to move and secure a large-sized bin 306 (or second bin 306). An example location of the second bin 306 on the second tile 304 is shown as location "L5". In an exemplary aspect, the second bin 306 may not include the longitudinal slot 214 described above in conjunction with FIG. 2, as the second bin 306 may not be required to move and be secured on the set of first tiles 210 including the gates 216. Instead, since the elevator 300 includes one or more large-sized tiles (e.g., the second tile 304), the second bin 306 may conveniently move and be secured on the second tile 304 without requiring the longitudinal slot 214.

The functioning of the first and second tiles 302, 304 is similar to the functioning of the set of first tiles 210 and the second tile 212, and hence is not described again here for the sake of simplicity and conciseness.

Figure 4:
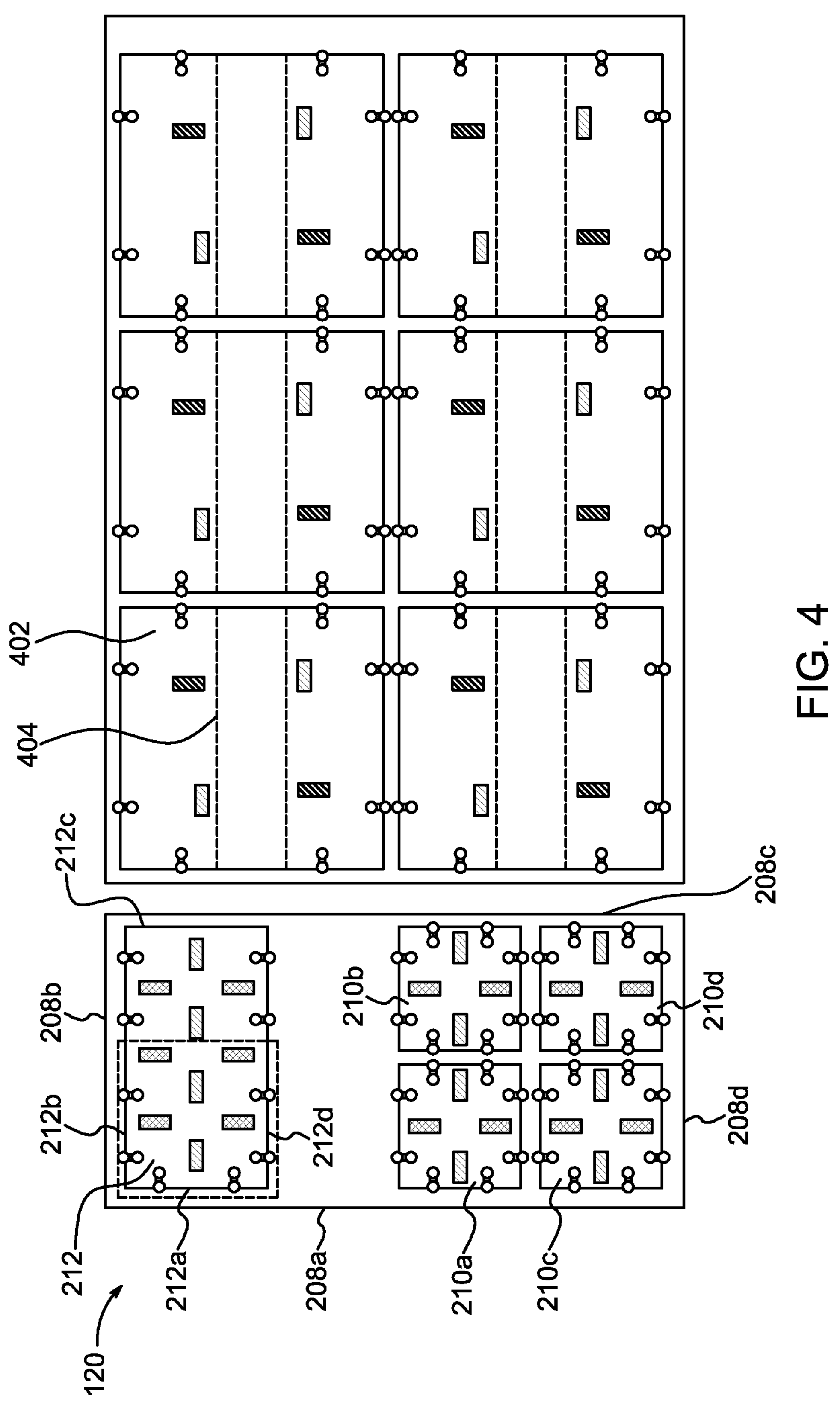
FIG. 4 depicts a top view of an example vehicle elevator and a plurality of motorized vehicle tiles in accordance with the present disclosure.

FIG. 4 depicts a top view of the elevator 120 and a plurality of motorized vehicle tiles 402 (or tiles 402) in accordance with the present disclosure. The tiles 402 may be similar in functionality to the plurality of motorized tiles 102 described above in conjunction with FIG. 1; however, the tiles 402 may have different sizes from the sizes associated with the motorized tiles 102.

In some aspects, each tile 402 may be configured to move and secure a large-sized bin, e.g., the third bin 306 (that includes the longitudinal slot 214). Each tile 402 may a square-shaped, as shown in FIG. 4, and dimension of each edge of the tile 402 may be equivalent to dimension of each edge of the base of the third bin 306. As shown in FIG. 4, the tile 402 may not include any gates or wheels at a portion 404 on which the longitudinal slot 214 may be located, when the third bin 306 may move or be secured on the tile 402.

The process of bin movement on the tiles 402 and/or the elevator 120 is similar to the process of bin movement described above in conjunction with FIGS. 1 and 2, and hence is not described again here for the sake of simplicity and conciseness.

Figures 5A, 5B:
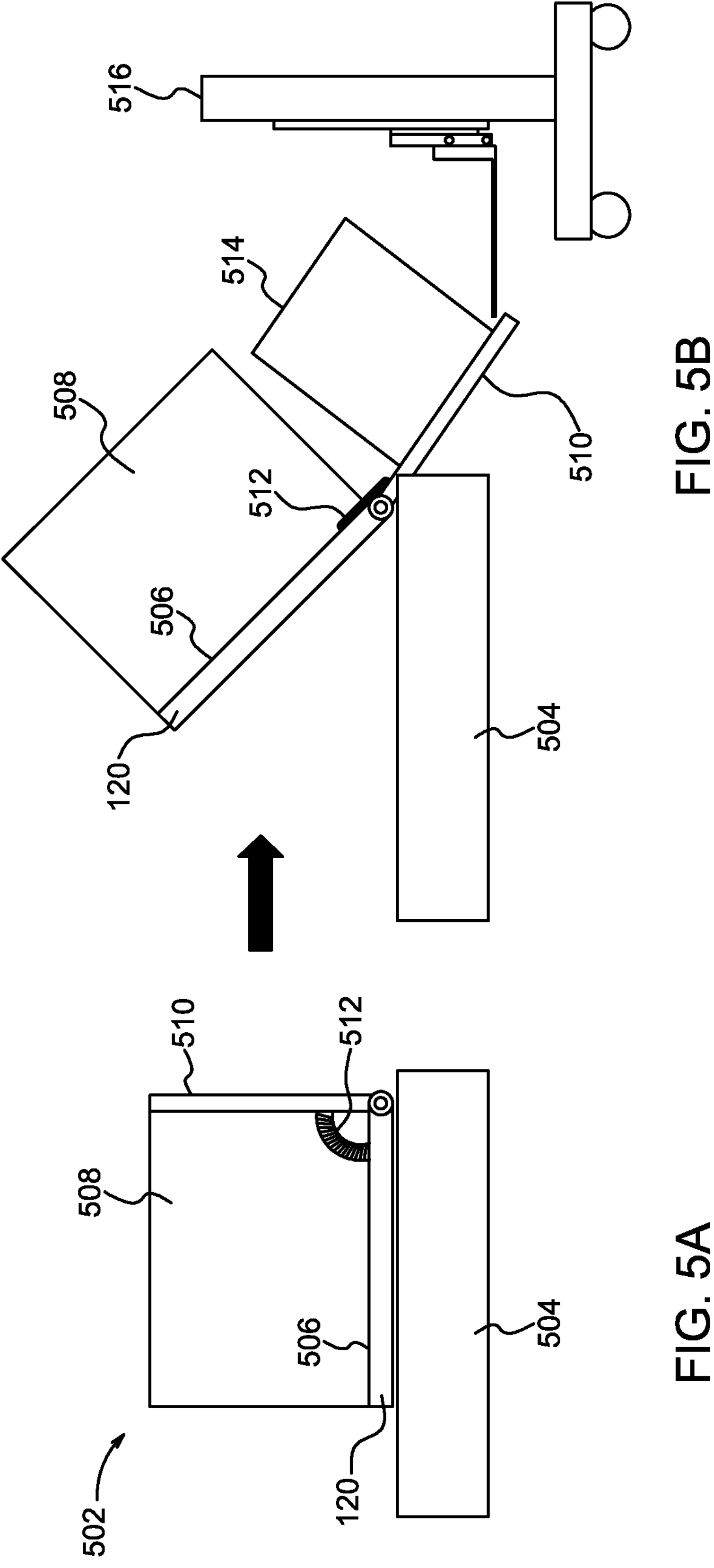
FIGS. 5A and 5B depict views of an example first system for unloading a bin in accordance with the present disclosure.

FIGS. 5A and 5B depict views (e.g., side views) of an example first system for unloading a bin 502 in accordance with the present disclosure. FIGS. 5A and 5B specifically depict a system to autonomously unload the bin 502 from the vehicle 100 when the bin 502 may be secured on one or more elevator tiles associated with the elevator 120, and the elevator 120 may be disposed in proximity to a vehicle cargo bed 504.

The bin 502 may be same as the first bin 202, the second bin 204 or the third bin 206 described above. In some aspects, the bin 502 may be a hollow cube or cuboid, and may include a base 506, side walls 508 and a side panel 510 disposed in any one bin sidewall. In an exemplary aspect, a side panel bottom edge may be pivotally attached, via a pivotal attachment mechanism 512, to an edge of the base 506. The pivotal attachment mechanism 512 may be a spring or any other similar pivotal attachment mechanism that may enable the side panel 510 to axially rotate relative to the base 506. In some aspects, the pivotal attachment mechanism 512 may enable the side panel 510 to move between a closed position and an open position. The side panel 510 in the closed position is shown in FIG. 5A, and the side panel 510 in the open position is shown in FIG. 5B.

In some aspects, the side walls 507 and the side panel 510 may define an enclosure in a bin interior portion in which a delivery package 514 may be stored/secured. The side panel 510 may enable automated unloading (and loading) of the delivery package 514 from (to) the bin 502, as described below.

In some aspects, the elevator 120 may be configured to move or tilt (or "tip") the bin 502 from a first positon to a second position, when the bin 502 may be disposed on the elevator 120 (or the elevator tiles) and the elevator 120 may be disposed in proximity to the vehicle cargo bed 504. In an exemplary aspect, the base 506 may be coplanar with the vehicle cargo bed 504 when the bin 502 may be in the first position. On the other hand, the base 506 may be non-coplanar with the vehicle cargo bed 504 when the bin 502 may be in the second position. Stated another way, the plane of the base 506 may be disposed parallel to the vehicle cargo bed 504 when the bin 502 may be in the first position, and may be disposed at a predefined non-zero angle relative to the vehicle cargo bed 504 when the bin 502 may be in the second position. An example bin first position is depicted in FIG. 5A and an example bin second position is depicted in FIG. 5B.

In some aspects, when the bin 502 moves from the first position to the second position, the delivery package 514 may slide in the enclosure, and the weights associated with the delivery package 514 and the side panel 510 may overcome spring force of the pivotal attachment mechanism 512 to automatically move the side panel 510 from the closed position to the open position. When the side panel 510 moves to the open position, the delivery package 514 may slide off the enclosure through the side panel 510 and may be secured or picked by a package holding unit 516 that may be disposed in proximity to the elevator 120 or the vehicle cargo bed 504, as shown in FIG. 5B. In an exemplary aspect, the package holding unit 516 may be a delivery or warehouse robot that may be configured to move the delivery package 514 to a package storage area in the warehouse, when the delivery package 514 may be secured on the package holding unit 516.

In operation, the processor 112 may obtain a second trigger signal via the transceiver 116 to enable autonomous bin unloading. In some aspects, the processor 112 may obtain the second trigger signal from the server described above in conjunction with FIG. 1, the user device associated with the vehicle operator, the vehicle information system, one or more vehicle proximity and/or weight sensors, vehicle cameras, and/or one or more sensors disposed in the warehouse where the vehicle 100 may be unloading packages (e.g., the delivery package 514). In some aspects, the processor 112 may obtain the second trigger signal when the bin 502 may be secured on the elevator tiles, and the elevator 120 may be disposed in proximity to the vehicle cargo bed 504. In further aspects, the processor 112 may obtain the second trigger signal when the package holding unit 516 may be disposed in proximity to the elevator 120 or the vehicle cargo bed 504.

Responsive to obtaining the second trigger signal, the processor 112 may cause the elevator 120 to move the bin 502 from the first position to the second position, thereby enabling the delivery package 514 to slide in the enclosure and causing the side panel 510 to move from the closed position to the open position. When the delivery package 514 slides off the enclosure, the package holding unit 516 may secure or pick the delivery package 514, as described above. In this manner, the vehicle 100 enables autonomous bin unloading.

The process of bin loading may be similar (and reverse) to the unloading process described above. Specifically, the elevator 120 may move (or tilt) the bin 502 to the second position during the loading process, and the package holding unit 516 may push or drop delivery packages into the enclosure, thereby enabling autonomous bin loading.

Although the description above describes an aspect where the elevator 120 moves the bin 502 from the first position to the second position, the present disclosure is not limited to this described aspect. In some aspects, the vehicle 100 may include any other movement/actuation mechanism that may enable the bin 502 to move between the first and second positions.

Figures 6A, 6B:
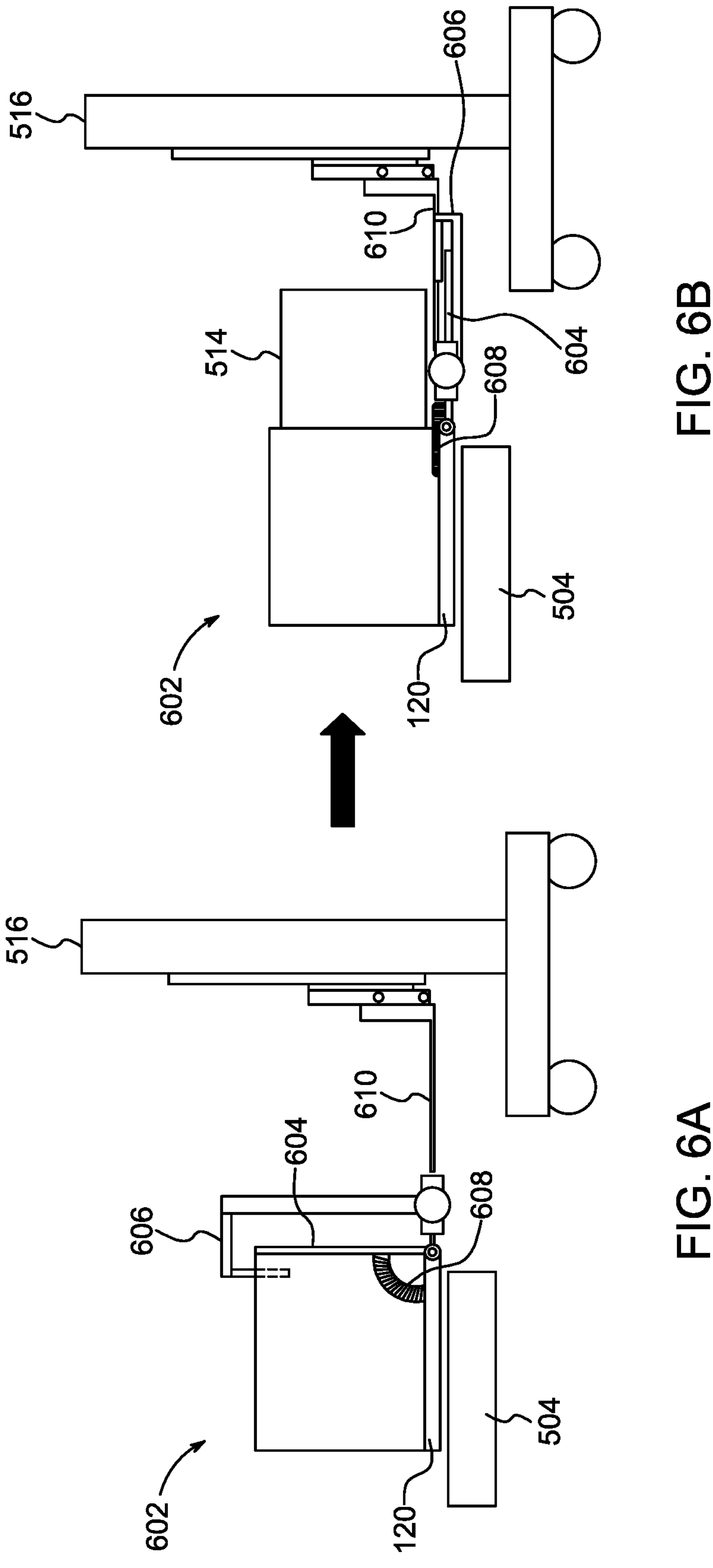
FIGS. 6A and 6B depict views of an example second system for unloading a bin in accordance with the present disclosure.

FIGS. 6A and 6B depict views (e.g., side views) of an example second system for unloading a bin 602 in accordance with the present disclosure. The bin 602 may be same as the bin 502. FIGS. 6A and 6B specifically describes a system for bin unloading/loading where the elevator 120 may not be configured to move or tilt the bin 602 from the first position to the second position.

In this case, the elevator 120 may include a mechanical arm 606 that may engage with a bin side panel 604 (same as the side panel 510) when the bin 602 may be disposed on the elevator 120 and be in proximity to the vehicle cargo bed 504 and the bin 602 may be required to be unloaded, as shown in FIG. 6A. Responsive to engaging with the bin side panel 604, the mechanical arm 606 may "pull" the bin side panel 604 to overcome the spring force of a bin pivotal attachment mechanism 608 (same as the pivotal attachment mechanism 512) to move the bin side panel 604 to the open position/state, as shown in FIG. 6B.

When the bin side panel 604 may be disposed substantially parallel to the vehicle cargo bed 504 (or when the bin side panel 604 may be fully open), a mechanical fork 610 may slide under the delivery package 514 to lift and pull the delivery package 514 towards the package holding unit 516, thereby enabling autonomous bin unloading from the vehicle 100 and bin loading to the package holding unit 516.

The process of bin loading to the vehicle 100 may be similar (and reverse) to the unloading process described above. Specifically, in this case, the mechanical arm 606 may open the bin side panel 604, and the mechanical fork 610 may push package(s) to be loaded into the bin 602 via the open bin side panel 604.

Figures 7A, 7B:
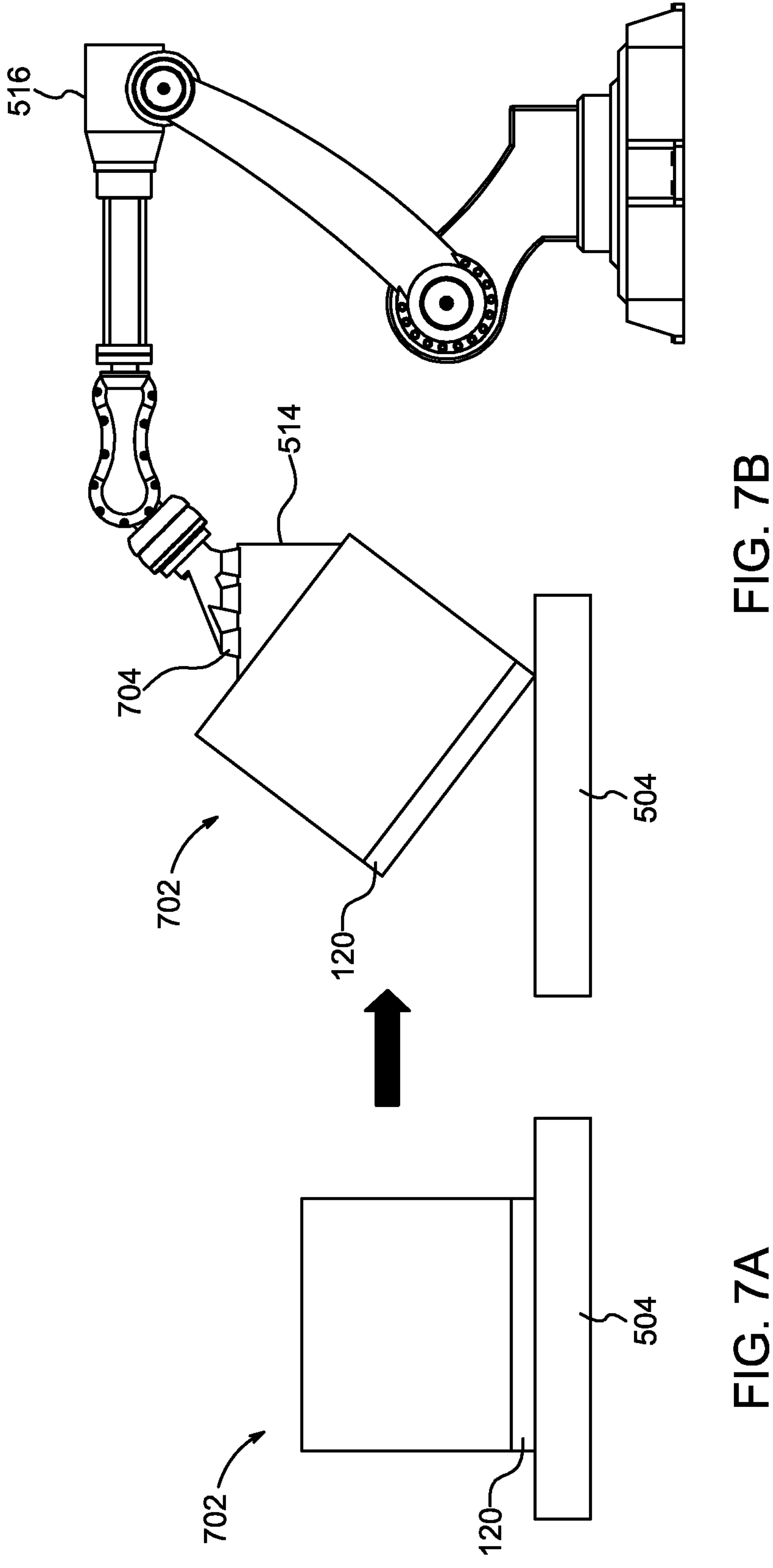
FIGS. 7A and 7B depict views of an example third system for unloading a bin in accordance with the present disclosure.

FIGS. 7A and 7B depict views (e.g., side views) of an example third system for unloading a bin 702 in accordance with the present disclosure. The bin 702 may be similar to the bin 502; however, the bin 702 may not include the side panel 510. In the system depicted in FIGS. 7A and 7B, the elevator 120 may be configured to move/tilt the bin 702 from the first position (as shown in FIG. 7A) to the second position (as shown in FIG. 7B).

In this case, the package holding unit 516 may include a suction mechanism 704 that may pick the delivery package 514 from the bin enclosure when the bin 702 may be in the second position, as shown in FIG. 7B, to unload the bin 702 from the bin 702/vehicle 100.

The process of bin loading to the vehicle 100 may be similar (and reverse) to the unloading process described above. Specifically, in this case, the suction mechanism 704 may place the package(s) to be loaded into the bin 702 when the bin 702 may be in the second position.

Figure 8:
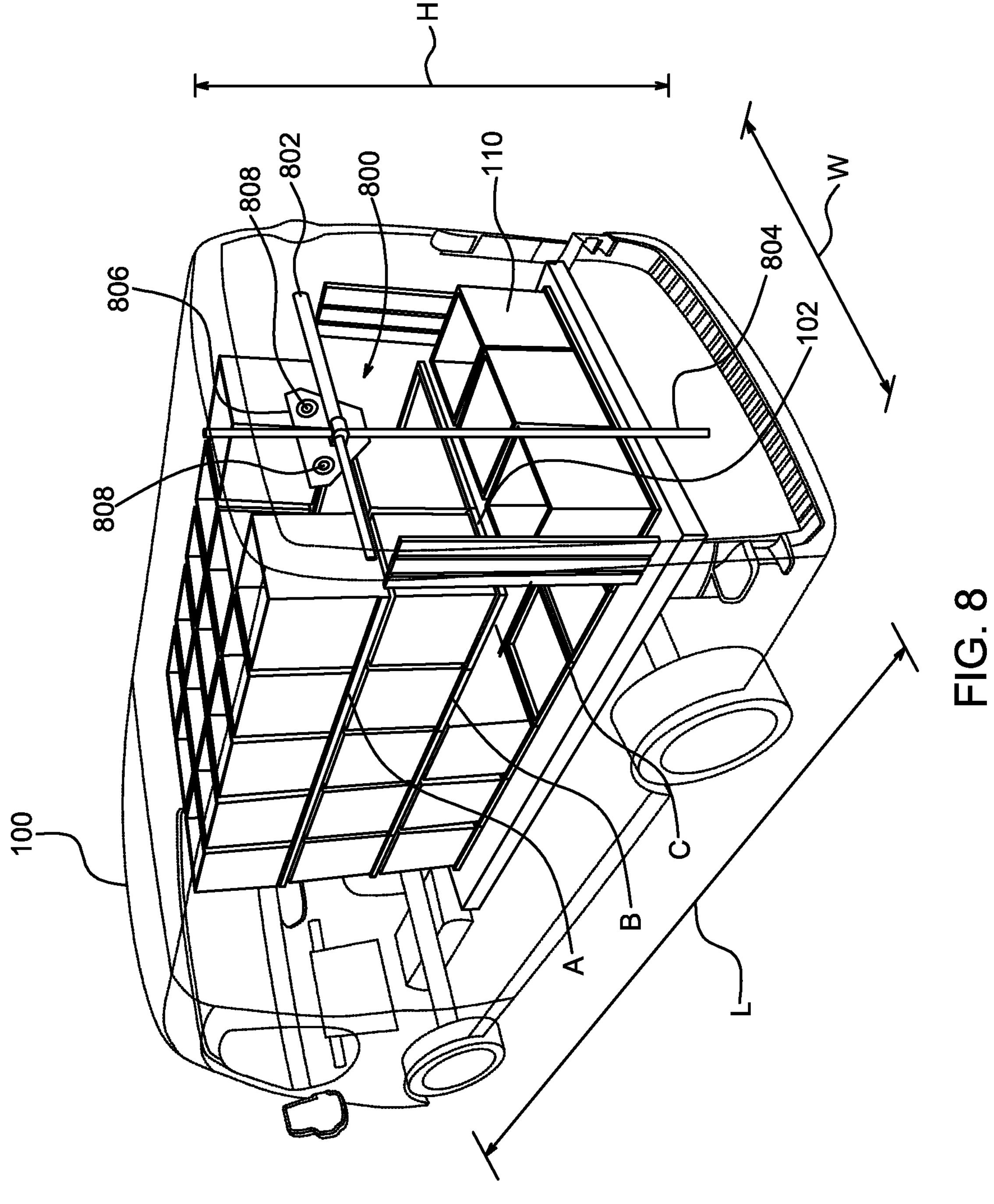
FIG. 8 depicts an example bin grabbing system in accordance with the present disclosure.

FIG. 8 depicts an example bin grabbing system 800 (or system 800) in accordance with the present disclosure. While describing FIG. 8, references will be made to FIGS. 9A, 9B and 9C that depict views of system usage.

The system 800 may be similar to a gantry system and may be disposed in the vehicle interior portion. The system 800 may be configured to load/unload the bins 110 to/from the upper layer "A", the middle layer "B" and the lower layer "C" of the motorized tiles 102. In some aspects, the system 800 may be installed in the vehicle 100 in addition to the elevator 120 described above. In other aspects, the vehicle 100 may include the system 800 and may not include the elevator 120.

In an exemplary aspect, the system 800 may include a first elongated structure 802 and a second elongated structure 804. The first elongated structure 802 may be connected between the vehicle side walls, and the second elongated structure 804 may be connected between a vehicle top portion and the vehicle cargo bed (e.g., the vehicle cargo bed 504). In some aspects, the second elongated structure 804 may be configured to move horizontally along a vehicle width "W". In other aspects, the first elongated structure 802 may be configured to move vertically up and down along a vehicle/side wall height "H". In additional aspects, the first and second elongated structures 802 and 804 may be configured to move along a side wall or vehicle length "L".

The system 800 may further include a bin grabber 806 that may include one or more grabbing mechanisms 808. The grabbing mechanisms 808 may be, for example, cleats or hooks. The bin grabber 806 may be slidably attached to the first and second elongated structures 802 and 804, such that the bin grabber 806 may slide along the lengths of the first and the second elongated structures 802 and 804. The bin grabber 806 may be configured to move in 3-dimensional space (e.g., in X, Y or Z direction) in the vehicle interior portion via the first and the second elongated structures 802 and 804. In some aspects, the processor 112 may be communicatively coupled with the bin grabber 806 and/or the first and second elongated structures 802 and 804, and may be configured to control their movement in the vehicle interior portion.

Figures 9A, 9B, 9C:
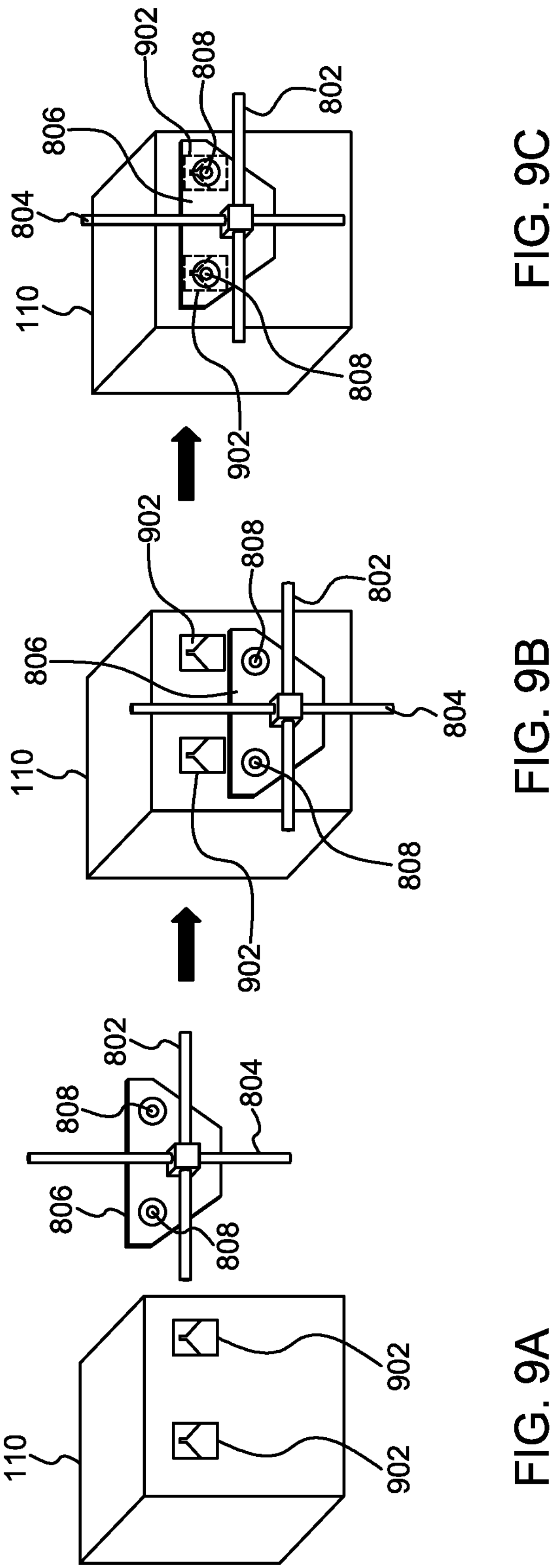
FIGS. 9A-9C depict views of usage of the bin grabbing system of FIG. 8, in accordance with the present disclosure.

In an exemplary aspect, one or more sidewalls of each bin 110 may include one or more receivers or cavities 902, as shown in FIGS. 9A-9C. Shape of each receiver 902 may correspond to shape of each grabbing mechanism 808, such that the grabbing mechanism 808 may easily insert into and lock/secure the grabbing mechanism 808 with the receiver 902. In some aspects, the receivers 902 may be disposed flush with the surface of bin side walls to prevent snagging of adjacent bins when the bin 110 may move on the plurality of tiles 102. Further, all the bins 110 may have receivers of same shape and size. Furthermore, each receiver 902 may be narrow enough to fit the smallest-sized bins, and be large enough to provide stability while lifting the largest-sized bins by using the bin grabber 806.

In operation, when the bin 110 may be required to be unloaded from the vehicle 100, the processor 112 may cause the plurality of motorized tiles 102 to move the bin 110 in proximity to the bin grabber 806, as shown in FIG. 9A. Responsive to the bin 110 being in proximity to the bin 110, the processor 112 may transmit a command signal to the bin grabber 806 to position the grabbing mechanisms 808 in proximity to the receivers 902, and mechanically insert/engage the grabbing mechanisms 808 into/with the receivers 902, as shown in FIG. 9B. The processor 112 may then transmit another command signal to the bin grabber 806 to pull the bin 110 from the motorized tile 102 on which the bin 110 may be placed, as shown in FIG. 9C. In this case, the wheels 106, 108 associated with the motorized tile 102 may move and the gates 104 may "slide away" from each other to enable the bin grabber 806 to pull the bin 110 from the motorized tile 102.

Responsive to pulling the bin 110 from the motorized tile 102, the processor 112 may transmit another command signal to the bin grabber 806 to move the bin grabber 806 (with the bin 110 engaged with the grabbing mechanisms 808) in proximity to the vehicle cargo bed 504. When the bin grabber 806 may be disposed in proximity to the vehicle cargo bed 504, the bin grabber 806 may cause the grabbing mechanisms 808 to disengage with the receivers 902. Thereafter, the vehicle operator, the drone or the package holding unit 516 may pick the bin 110 for the vehicle cargo bed 504.

Bin loading process using the bin grabber 806 may be similar (and reverse) to the unloading process described above. Specifically, a bin to be loaded is first disposed on the vehicle cargo bed 504. The bin grabber 806 may then cause the grabbing mechanisms 808 to engage with the receivers 902 to lift the bin from the vehicle cargo bed 504. Responsive to lifting the bin, the bin grabber 806 may move the bin to a motorized tile that may be in proximity to the destination motorized tile of the bin. When the bin may be in proximity to or on the motorized tile, the bin grabber 806 may cause grabbing mechanisms 808 to disengage with the receivers 902, thereby enabling bin loading into the vehicle 100.

A person ordinarily skilled in the art may appreciate from the description above that the bin grabber 806 may be configured to load and unload bins of different sizes to/from the vehicle 100, without requiring the elevator 120.

Figure 10:
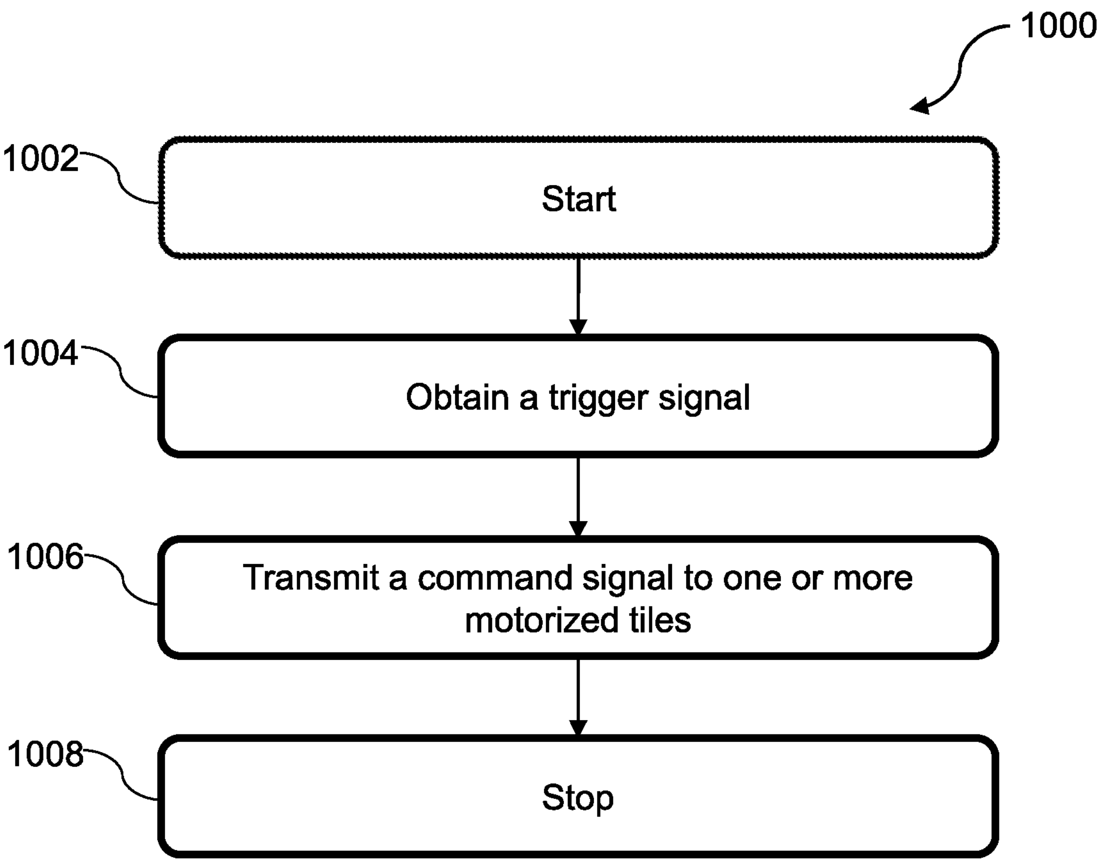
FIG. 10 depicts a flow diagram of an example method for facilitating movement of bins in a vehicle interior portion in accordance with the present disclosure.

FIG. 10 depicts a flow diagram of an example method 1000 for facilitating movement of bins in a vehicle interior portion in accordance with the present disclosure. FIG. 10 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 1000 starts at step 1002. At step 1004, the method 1000 may include obtaining, by the processor 112, the first trigger signal. In some aspects, the processor 112 may obtain the trigger signal when the vehicle 100 may have reached a package delivery location or a warehouse, and a bin (e.g., the bin 110) may be required to be unloaded from the vehicle 100.

At step 1006, the method 1000 may include transmitting, by the processor 112, command signals to one or more motorized tiles from the plurality of motorized tiles 102 to cause bin movement and enable the bin 110 to be moved to the elevator 120 (e.g., to one of the elevator tiles described above) responsive to obtaining the first trigger signal, as described above in conjunction with FIG. 2.

The method 1000 ends at step 1008.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a plurality of first motorized tiles disposed in a vehicle interior portion, wherein the plurality of first motorized tiles is configured to move and secure a first bin of a first size and a second bin of a second size; and a vehicle elevator comprising:

a second motorized tile configured to receive the second bin from the plurality of first motorized tiles and secure the second bin, wherein the second motorized tile is of a third size; and a set of third motorized tiles, wherein each third motorized tile is configured to receive the first bin from the plurality of first motorized tiles and secure the first bin, and wherein each third motorized tile is of a fourth size.

2. The vehicle of claim 1, wherein the first size is different from the second size, and wherein the fourth size is different from the third size.

3. The vehicle of claim 1, wherein the fourth size is equivalent to the first size.

4. The vehicle of claim 1, wherein the plurality of first motorized tiles is further configured to secure a third bin of a fifth size.

5. The vehicle of claim 4, wherein the fifth size is greater than the first size, and wherein the set of third motorized tiles is configured to receive the third bin from the plurality of first motorized tiles and secure the third bin.

6. The vehicle of claim 1 further comprising a processor communicatively coupled with the plurality of first motorized tiles and the vehicle elevator, wherein the processor is configured to:

obtain a first trigger signal; and responsive to obtaining the first trigger signal, transmit at least one of:

a first command signal to the plurality of first motorized tiles to cause movement of the first bin to a third motorized tile from the set of third motorized tiles; and a second command signal to the plurality of first motorized tiles to cause movement of the second bin to the second motorized tile.

7. The vehicle of claim 6, wherein the first bin is configured to store a delivery package, wherein the first bin comprises a base and a side panel, and wherein the side panel is configured to move between an open position and a closed position.

8. The vehicle of claim 7, wherein the vehicle elevator is configured to move the first bin between a first position and a second position when the first bin is secured on the third motorized tile, and wherein the base is coplanar with a vehicle cargo bed in the first position and non-coplanar with the vehicle cargo bed in the second position.

9. The vehicle of claim 8, wherein the processor is further configured to:

obtain a second trigger signal; and cause the vehicle elevator to move the first bin from the first position to the second position responsive to obtaining the second trigger signal, wherein the side panel moves from the closed position to the open position when the first bin moves from the first position to the second position.

10. The vehicle of claim 9, wherein the processor obtains the second trigger signal when the first bin is secured on the third motorized tile.

11. The vehicle of claim 9, wherein the first bin further comprises side walls defining an enclosure in a first bin interior portion, and wherein the first bin is configured to store the delivery package in the enclosure.

12. The vehicle of claim 11, wherein the side panel moves from the closed position to the open position when the delivery package slides in the enclosure, responsive to the first bin moving from the first position to the second position.

13. The vehicle of claim 12, wherein the delivery package is secured in a package holding unit when the delivery package slides off the enclosure through the side panel when the side panel moves from the closed position to the open position.

14. The vehicle of claim 13, wherein the processor obtains the second trigger signal when the package holding unit is disposed in proximity to the vehicle elevator.

15. The vehicle of claim 7, wherein an edge of the side panel is pivotally connected with an edge of the base to enable the side panel to move between the open position and the closed position.

* * * * *